Figure 1:
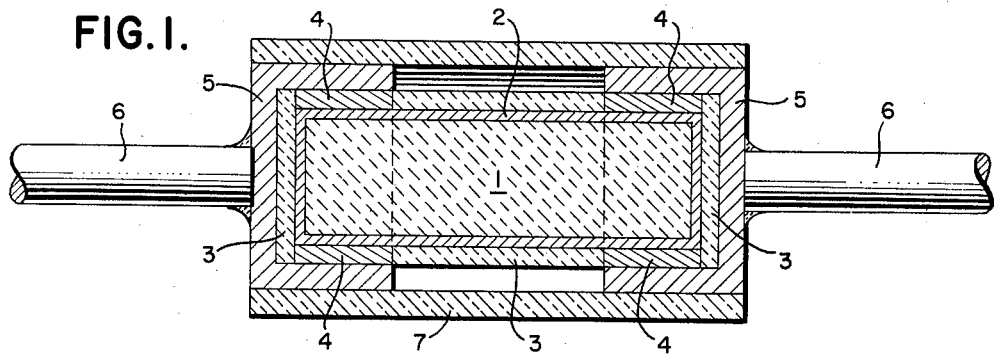

April 5, 1966  D. R. SIVERTSEN ET AL  3,244,559
MODIFIED CARBON FILM RESISTOR AND METHOD OF MAKING
Filed March 7, 1961

INVENTORS
David R. Sivertsen,
Cecil L. Slattum

BY
*Stevens, Davis, Miller & Mosher*
ATTORNEYS

United States Patent Office 3,244,559
Patented Apr. 5, 1966

3,244,559
MODIFIED CARBON FILM RESISTOR AND
METHOD OF MAKING
David R. Sivertsen and Cecil L. Slattum, Dallas, Tex.,
assignors to Texas Instruments Incorporated, Dallas,
Tex., a corporation of Delaware
Filed Mar. 7, 1961, Ser. No. 93,933
12 Claims. (Cl. 117—215)

The present invention relates to a novel resistor package and to a unique and improved method for encapsulating resistors. More particularly, the present invention relates to a novel carbon-film resistor package and to a unique and improved method for encapsulating a carbon-film resistor to protect and preserve the carbon film.

In the resistor art, it is common practice to prepare low-priced resistors by coating a film of crystalline carbon on a ceramic substrate, usually in the form of a cylindrical core. The techniques for accomplishing such a coating are well known in the art. The coated ceramic cores are thereafter encapsulated by a wide variety of means.

Carbon-film resistors, as known in the art, have not been fully satisfactory from the standpoint of load life, stability, moisture resistance and other reasons. In attempting to determine why this is so, it has been discovered that degradation of the resistor's characteristics and the inability of the resistor to perform satisfactorily over extended periods of time are directly attributable to the encapsulation of the resistor element. Consequently, the present invention was originally conceived as a means for hermetically encapsulating or packaging a carbon-film resistor to tolerances and specifications more rigid than those met by carbon-film resistors of the prior art.

This is accomplished in the present invention by depositing on a carbon-coated ceramic core in an inert or reducing atmosphere a refractory coating composed of, for example, one or more oxides of silicon, iron, calcium, magnesium, boron, aluminum, zirconium and titanium obtained from the thermal decomposition of one or more organic compounds containing at least one of the named elements and oxygen. The refractory coating deposited in this fashion is quite thin, about 2,000 angstrom units in thickness and, therefore, it suffices as a protective barrier against moisture and foreign matter that would adversely affect the properties of the carbon film. Carbon-film resistors are usually scored to make final value adjustments just prior to hermetic sealing. This scoring would take place after the refractory coating has been deposited and, therefore, edges of the carbon film will be exposed. To complete the encapsulation, one of two approaches is taken. A glass composition may be intimately coated over the refractory coating or a glass composition can be arranged in a spaced relation with respect to the refractory coating. Both approaches produce hermetically sealed units and both require glass compositions that must be alkali metal-free and halogen-free. The first approach—intimate coating—has already been considered by the prior art and generally discarded as unfeasible unless an alumina silicate glass composition is employed. Borosilicate glass compositions, as well as others, are wholly unsuitable.

If the second approach is followed, it is possible to use a lower grade of glass, even borosilicates, but the atmosphere within the space must be definitely reducing in nature, e.g., hydrogen.

Accordingly, it is an object of this invention to provide a novel hermetically sealed resistor package for a carbon-film resistor which is substantially superior to packages currently known and used, in that the resistor will have markedly improved stability and longer life.

It is a further object of this invention to provide a novel method for hermetically packaging or encapsulating a carbon-film resistor which will impart greater stability and longer life to the carbon-film resistor than it has heretofore been possible to achieve.

It is a further object of this invention to provide a novel hermetically sealed carbon-film resistor package that is simple, rugged and of low cost.

It is another object of this invention to provide a novel method for hermetically encapsulating a carbon-film resistor by a refractory coating obtained in an inert or reducing atmosphere by thermal decomposition of an organic compound and a further coating composed of an alkali metal-free and halogen-free glass composition.

Figure 2:
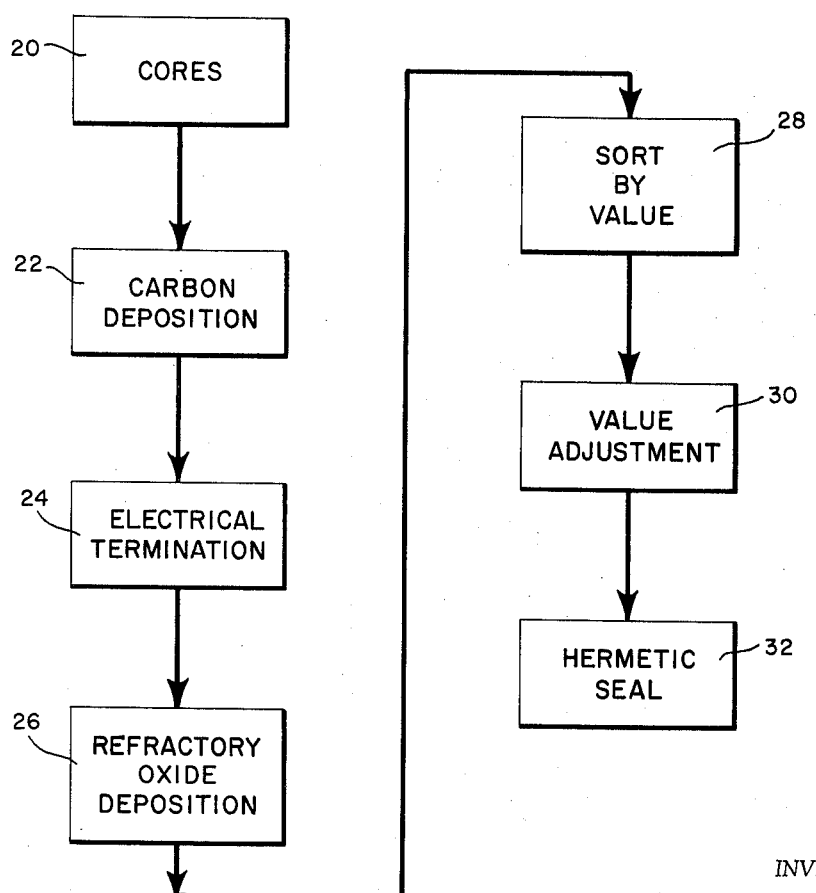

Other and further objects and advantages of this invention will appear from the following detailed description of a preferred embodiment of the invention and best mode for carrying out the invention when taken in conjunction with the appended claims and attached drawing in which:

FIGURE 1 is a view in section of the novel resistor package of the present invention; and FIGURE 2 is a block diagram illustrating the process of the present invention.

Referring now to the drawing, FIGURE 1 shows the preferred embodiment of novel carbon-film resistor package made according to the teachings and concepts of the present invention. As appears, a conventional ceramic core 1 is entirely coated with a crystalline carbon deposit 2 by well-known techniques. A refractory coating 3 comprised of, for example, one or more oxides of silicon, iron, calcium, magnesium, boron, aluminum, zirconium and titanium acts as a protective barrier for carbon film 2. Electrical terminations 4 composed of silver, gold, nickel or graphite, by way of example, are coated as rings on opposite ends of the core 1. These terminations can be applied in any suitable way, but are usually applied as a particulate mass with an organic binder or carrier. End caps 5 are press-fitted over terminations 4 and lead wires 6 are attached by welding to caps 5. Wire 6 may be copper or the like, and caps 5 may be composed of brass, Kovar, Rodar, and Therlo. The last three are well-known trade names for iron-nickel-cobalt alloys of Westinghouse Electric Corp., Wilbur B. Driver Co., and Driver-Harris Co., respectively. Finally, a glass composition 7 is sealed to end caps 5 and encloses the cylindrical area of the package. Glass composition 7 is alkali metal-free and halogen-free and, for example, is composed of silicon oxide and one or more oxides of aluminum, lead, boron, barium, calcium, iron, antimony, arsenic, strontium, cesium, and zinc.

The method of the present invention will now be described with reference to FIGURE 2.

The first step in the method is to prepare ceramic cores for the carbon film deposition (block 20). The ceramic cores are approximately .335 inch in length, cylindrical in form, and 0.062 inch in diameter. Thus, the cores have a surface area of 0.0712 square inch per core. The materials for the cores, as well as their production and purity, are well known in the art. The second step in the process is to deposit a crystalline carbon film on the surface of each core (block 22). This is done by conventional methods. The next step of the process is to place electrical terminations at each end of the core in electrical contact with the deposited crystalline carbon film (block 24). This also is a conventional step and the manner of carrying it out is well known in the art. The electrical terminations, for example, may be composed of silver, gold, nickel and graphite and are usually coated onto the carbon film as rings at opposite ends of the electrical core. The electrical terminations may be coated as particulate masses with an organic binder or material or sputtered on.

The next step in the process is to deposit a thin protective coating over the carbon film to provide a protective barrier and to stabilize the carbon film (block 26). This is accomplished by means of the present invention by placing the carbon-coated cores into a chamber, at atmospheric pressure or slight vacuum, and in a reducing atmosphere, and subjecting them to one or more organic compounds containing oxygen and an element such as silicon, iron, calcium, magnesium, boron, aluminum, zirconium and titanium that decomposes within the temperature range of from about 750° C. to about 1050° C. to yield a refractory oxide. The refractory oxide completely coats the cores including the carbon film and electrical terminations. During the step of coating with a refractory oxide, the organic compound and the organic binder in the electrical terminations, if one is used, may thermally decompose to yield a form of carbon, probably amorphous, which may degenerate the electrical characteristics of the crystalline carbon film. This carbon can be removed from the chamber by conducting the reaction under vacuum or, alternatively, it may be desirable under certain circumstances to include water vapor in the reducing atmosphere in an amount sufficient to oxidize the carbon so formed. If water vapor is used, approximately 10% of the atmosphere introduced into the reaction chamber is first bubbled through a water bottle to entrain water vapor.

It should be recognized that if the reaction is conducted in an atmosphere containing oxygen, this will deleteriously act upon the crystalline carbon film. Therefore, it is important that the atmosphere be reducing and, for this purpose, it is preferred that a hydrogen atmosphere be employed, or at least an atmosphere a part of which is composed of hydrogen. The remainder of the atmosphere may be composed of an inert gas, such as nitrogen, helium, neon, argon and krypton. It has been found in the practice of the present invention that use of an inert gas per se will not produce the same consistent results obtained with a reducing atmosphere, and this is explained by the fact that inert atmospheres seem to contain trace amounts of oxygen. The reaction progresses for from about one-half minute to about 120 minutes during which time a thin coating of refractory oxide is formed completely surrounding the cores. Although this range of times may be considered as operable, it is preferred that the reaction time be confined to from about five minutes to about twenty minutes as superior results are obtained using times in this range. Examples of organic compounds which may be utilized in this step of the process are tetraethylorthosilicate, trimethylborate, tetraethylorthotitanate, aluminum isopropoxide, and aluminum ethoxide.

After the refractory oxide deposition, as described above, the resistor elements are sorted by value, as indicated by block 28 of the diagram of FIGURE 2 and thereafter, are treated to adjust their values finally (block 30). The technique for doing this is well known in the art and consists of scoring the resistor elements to remove a portion of the carbon film while the resistance of the element is being checked. As will be appreciated, the carbon film at this time lies beneath the refractory oxide coating and, consequently, it will be necessary to remove the refractory oxide coating also. Consequently, edges of the carbon film will be exposed and the elements must be thereafter hermetically sealed (block 32) as hereinafter described. It should be pointed out at this time that the refractory coating is extremely thin, on the order of 2000 angstrom units. Its function is primarily to protect the carbon film from foreign matter which would degrade it and to stabilize the carbon film otherwise. The mass of the protective coating is quite small and, therefore, differences in the thermal properties of the refractory coating and carbon film will not result in strains being introduced into the carbon film, thereby changing its resistance value. The principal contributions of the refractory protective coating are to establish a barrier that substantially improves the moisture resistance characteristics of the element and to establish a protective coating that greatly improves the stability of the element, thereby increasing its load life. Surprisingly, it has been discovered that the refractory coating actually modifies the electrical properties of the carbon film. For example, significant improvements have been noted in the temperature coefficient of resistance of the carbon film after the refractory coating has been applied.

Thereafter, the elements are encapsulated by first press-fitting end caps onto the electrical terminations, during which step the refractory oxide covering the electrical terminations is ruptured and, hence, the end caps make good electrical contact with the electrical terminations. The end caps may be composed of brass, Kovar, Rodar, or Therlo, as noted. The end caps have soft copper leads welded to them which constitute the leads of the final resistor element.

The final step in the encapsulation (block 32) is to enclose the resistor elements within a glass composition that is substantially alkali metal-free and halogen-free. As noted, if the glass is applied directly onto the refractory coating, only an alumina silicate glass, such as Corning 1723 glass (Corning Glass Works) or Kimble EE2 glass (Kimble Division, Owens-Illinois Glass Co.) can be used. The glass can be applied in any way by dipping, painting, spraying, etc. If a spaced glass enclosure is used, the glass may be low grade and includes the use of borosilicate glass such as Kimble EN2 (Kimble Division, Owens-Illinois Glass Co.) and Corning 7056 (Corning Glass Works), as well as others. The glass enclosure in this instance is a sleeve which is placed around the resistor element and the ends of the glass sleeve are sealed to the end caps in a furnace. For this purpose, the end caps are sandblasted to roughen their surfaces to ensure better contact with the glass. The glass-to-metal seal thus formed is hermetic in character and, consequently, the end caps and glass serve to seal hermetically the resistor element in a spaced relationship with respect to the glass. The glass sealing operation is conducted in an inert or reducing atmosphere, but preferably in a reducing atmosphere for the reasons previously explained. It will be noted that edges of the carbon film are exposed and, consequently, great care should be exercised to ensure that no changes in resistance value take place in the element during the encapsulation in the glass sleeve. The encapsulation thereof is conducted at atmospheric pressure as a further protection against the glass sleeve being collapsed on the refractory oxide.

FEED STOCK

| Example | Type | Quantity, ml. | Deposit Temp., °C | Deposit Time, min. | Vacuum, inches | Furnace | Quantity Cores |
|---|---|---|---|---|---|---|---|
| 1 | Tetraethylorthosilicate | 10 | 800 | 5 | 29 | Production | 1,000 |
| 2 | 99% Tetraethylorthosilicate, 1% Trimethylborate | 10 | 800 | 5 | 29 | ___do___ | 1,000 |
| 3 | 95% Tetraethylorthosilicate, 5% Trimethylborate | 10 | 800 | 5 | 29 | ___do___ | 1,000 |
| 4 | Tetraethylorthosilicate | 10 | 800 | 5 | 10 | ___do___ | 1,000 |
| 5 | 95% Tetraethylorthosilicate, 5% Trimethylborate | 5 | 780 | 20 | 22 | ___do___ | 1,000 |
| 6 | ___do___ | 5 | 820 | 20 | 22 | ___do___ | 1,000 |
| 7 | 100% Tetraethyorthosilicate | 2.5 | 880 | 10 | 28 | Laboratory | 600 |
| 8 | ___do___ | 5.0 | 880 | 20 | 28 | ___do___ | 200 |
| 9 | ___do___ | 5.0 | 880 | 20 | 28 | ___do___ | 100 |
| 10 | ___do___ | 2.5 | 880 | 10 | 28 | ___do___ | 100 |
| 11 | ___do___ | 2.5 | 880 | 10 | 28 | ___do___ | 400 |
| 12 | 95% Tetraethylorthosilicate, 5% Trimethylborate | 2.5 | 880 | 10 | 28 | ___do___ | 600 |
| 13 | ___do___ | 2.5 | 880 | 10 | 28 | ___do___ | 600 |
| 14 | ___do___ | 2.5 | 880 | 10 | 28 | ___do___ | 423 |
| 15 | ___do___ | 2.5 | 880 | 10 | 28 | ___do___ | 600 |
| 16 | 100% Tetraethylorthosilicate | 2.5 | 880 | 10 | 28 | ___do___ | 600 |
| 17 | Tetraethylorthosilicate | | 500 | 15 | 0 | Tube Furn. | 50 |
| 18 | ___do___ | | 600 | 15 | 0 | ___do___ | 50 |
| 19 | ___do___ | | 820 | 15 | 0 | ___do___ | 50 |
| 20 | Tetraethylorthosilicate plus Trimethylborate | | 820 | 15 | 0 | ___do___ | 50 |
| 21 | ___do___ | | 820 | 15 | 0 | ___do___ | 50 |
| 22 | ___do___ | | 820 | 15 | 0 | ___do___ | 50 |
| 23 | Tetraethylorthosilicate | 10 | 700 | 4'10" | 29 | Production | 1,000 |
| 24 | 90% Tetraethylorthosilicate (10% siopropyl alcohol saturated with sodium) | 5 | 900 | 20 | 28 | ___do___ | 500 |
| 25 | 100% Tetraethylorthosilicate | | 900 | 20 | 29 | ___do___ | 500 |
| 26 | ___do___ | 5 | 900 | 20 | 29 | ___do___ | 500 |

To afford an even better understanding of the present invention, specific examples of the step of coating with a refractory oxide were given above in tabular form.

In the above table, three different furnaces were employed, all of them being of the electric-muffle type and, therefore, electric resistance-heated. The production furnace had a volume of 3,000 ml., and was generally comprised of a quartz tube 7 3/10" in length, 6" outside diameter, and having a wall thickness of about 1/2". The laboratory furnace had a volume of 130 ml. and also consisted of a quartz tube 9 1/2" in length and 1" inside diameter. The tube furnace was also a quartz tube having a length of about 12" and an inside diameter of 1", but the entire tube section was not utilized as the hot reaction zone. Only about 2 1/2" of tube length were employed for this purpose.

Although the process has been described as placing the electrical terminations onto the carbon coating prior to depositing the refractory coating, it should be appreciated that these two steps can be reversed and the refractory coating placed over the carbon film first. It will be recalled from the foregoing description that the refractory coating is very thin. Consequently, the electrical termination when placed on the refractory coating can be of a nature to penetrate it due to its large mass or absorption qualities. If this be the case, good electrical contact will be made with the carbon film.

The present invention has been shown and described with respect to a preferred embodiment and the best mode for carrying out the invention. It will be duly noted that various modifications and changes can be made in the structure of the invention and the steps of the invention which do not depart from the inventive concepts taught herein. Accordingly, such departures are deemed to come within the purview of the invention.

What is claimed is:

1. A carbon film resistor package comprising a nonconductive substrate, a carbon film on said substrate, a thin refractory oxide coating on said film consisting of a thermally decomposed organic compound formed in a reducing atmosphere and means hermetically sealing said film and coating.

2. A package as in claim 1, wherein said refractory oxide includes an oxide of an element selected from the group consisting of silicon, calcium, boron, aluminum and titanium.

3. A package as in claim 1 wherein said means includes a glass composition.

4. A package as in claim 3 wherein said means is spaced from said refractory oxide coating.

5. A package as in claim 3 wherein said glass composition is an alumina silicate glass in intimate contact with said refractory oxide coating.

6. A method for encapsulating a carbon film resistor comprising thermally decomposing an organic compound in a reducing atmosphere to coat a carbon film resistance element with a refractory oxide and thereafter hermetically enclosing said refractory oxide and said element in glass.

7. A method according to claim 6 wherein said organic compound is selected from the group consisting of organic compounds containing oxygen and at least one material selected from the group consisting of silicon, calcium, boron, aluminum and titanium.

8. The method according to claim 6 wherein the thermal decomposition occurs from about 750° C. to about 1050° C.

9. The method according to claim 6 wherein said element is exposed to the thermally decomposing organic compound for from about 1/2 to about 120 minutes.

10. The method according to claim 6 wherein said element is exposed to the thermally decomposing organic compound for from about 5 to 20 minutes.

11. A method according to claim 6 wherein said refractory oxide and said element are hermetically enclosed within a glass composition.

12. The method according to claim 11 wherein said glass composition is in intimate contact with said refractory oxide and is an alumina silicate glass.

References Cited by the Examiner

UNITED STATES PATENTS

| 1,948,382 | 2/1934 | Johnson | 338—257 |
| 2,405,449 | 8/1946 | Robinson et al. | 117—216 |
| 2,721,154 | 10/1955 | Hopf et al. | 117—226 |

(Other references on following page)

UNITED STATES PATENTS

| | | | |
|---|---|---|---|
| 2,778,743 | 1/1957 | Bowman | 117—106 |
| 2,805,965 | 9/1957 | Robinson | 117—106 |
| 2,810,664 | 10/1957 | Genter | 117—226 |
| 2,831,780 | 4/1958 | Deyrup | 117—106 |
| 2,927,048 | 3/1960 | Pritikin | 117—215 |
| 2,934,736 | 4/1960 | Davis | 338—308 |
| 2,935,717 | 5/1960 | Solow | 338—308 |
| 2,938,772 | 5/1960 | Enk et al. | 117—106 |
| 2,989,421 | 6/1961 | Novak | 117—106 |
| 2,993,815 | 7/1961 | Treptow | 338—308 |
| 3,023,389 | 2/1962 | Hughes et al. | 338—237 |

FOREIGN PATENTS 806,190    12/1958    Great Britain.

JOSEPH B. SPENCER, *Primary Examiner.*

JOSEPH REBOLD, RICHARD D. NEVIUS, RAY W. WINDHAM, *Examiners.*